(12) United States Patent
Vijayaraghavan et al.

(10) Patent No.: US 8,477,831 B2
(45) Date of Patent: Jul. 2, 2013

(54) MULTI-PROTOCOL MULTIPLE-DATA-RATE AUTO-SPEED NEGOTIATION ARCHITECTURE FOR A DEVICE

(75) Inventors: Divya Vijayaraghavan, Mountain View, CA (US); Chong H. Lee, San Ramon, CA (US)

(73) Assignee: Altera Corporation, San Jose, CA (US)

( * ) Notice: Subject to any disclaimer, the term of this patent is extended or adjusted under 35 U.S.C. 154(b) by 337 days.

(21) Appl. No.: 12/860,482

(22) Filed: Aug. 20, 2010

(65) Prior Publication Data

US 2012/0307878 A1  Dec. 6, 2012

Related U.S. Application Data

(60) Provisional application No. 61/305,311, filed on Feb. 17, 2010.

(51) Int. Cl.
 *H04L 27/06* (2006.01)
(52) U.S. Cl.
 USPC .......................................... 375/220; 375/219
(58) Field of Classification Search
 USPC ....................................................... 375/220
 See application file for complete search history.

(56) References Cited

U.S. PATENT DOCUMENTS

| | | | |
|---|---|---|---|
| 5,243,299 A | 9/1993 | Marchetto et al. | |
| 5,257,019 A | 10/1993 | Schwendeman et al. | |
| 5,491,713 A | 2/1996 | Kwok et al. | |
| 5,838,749 A | 11/1998 | Casper et al. | |
| 5,995,512 A | 11/1999 | Pogue, Jr. | |
| 6,049,254 A | 4/2000 | Knapp et al. | |
| 6,072,827 A * | 6/2000 | Krulce | 375/225 |
| 6,223,083 B1 | 4/2001 | Rosar | |
| 6,243,429 B1 | 6/2001 | Akahori | |
| 6,650,140 B2 * | 11/2003 | Lee et al. | 326/39 |
| 6,683,920 B1 | 1/2004 | Coy | |
| 6,694,104 B1 | 2/2004 | Caplan et al. | |
| 6,798,869 B1 * | 9/2004 | Sidhu et al. | 379/93.33 |
| 6,826,717 B1 | 11/2004 | Draper et al. | |
| 6,970,020 B1 | 11/2005 | Mei et al. | |
| 7,020,227 B1 | 3/2006 | Wang et al. | |
| 7,076,033 B2 * | 7/2006 | Sidhu et al. | 379/93.08 |
| 7,088,133 B2 * | 8/2006 | Lee et al. | 326/39 |

(Continued)

FOREIGN PATENT DOCUMENTS

| | | |
|---|---|---|
| EP | 1 715 585 | 10/2006 |
| WO | WO 2007/002942 | 1/2007 |
| WO | WO 2008/076700 | 6/2008 |
| WO | WO 2009/126267 | 10/2009 |

*Primary Examiner* — Chieh M Fan
*Assistant Examiner* — Santiago Garcia
(74) *Attorney, Agent, or Firm* — Ropes & Gray LLP; Jeffrey H. Ingerman (57) ABSTRACT

An interface for use in a local device includes a transmitter portion programmably configurable to at least three data rates, a receiver portion programmably configurable to those at least three data rates, and an automatic speed negotiation module operatively connected to the transmitter portion and the receiver portion to configure the transmitter portion and the receiver portion for communication with a remote device at a single data rate that is a best available one of those at least three data rates. The date rate can be adjusted by adjusting transmitter data path width and receiver data path width, adjusting a frequency of said transmitter data path and said receiver data path, and oversampling. Byte serialization or deserialization can be enabled or disabled to alter the width of the data, depending on the data rate, for transfer to/from the remainder of the local device.

21 Claims, 6 Drawing Sheets

U.S. PATENT DOCUMENTS

| | | |
|---|---|---|
| 7,162,553 B1 * | 1/2007 | Xue et al. ............. 710/71 |
| 7,183,864 B1 | 2/2007 | Gutnik |
| 7,684,477 B1 * | 3/2010 | Vijayaraghavan et al. ... 375/225 |
| 8,165,191 B2 * | 4/2012 | Vijayaraghavan et al. ... 375/222 |
| 2002/0190751 A1 * | 12/2002 | Lee et al. ............. 326/39 |
| 2004/0022306 A1 | 2/2004 | Baumgartner |
| 2004/0114702 A1 | 6/2004 | Friedman et al. |
| 2005/0058290 A1 | 3/2005 | Kryzak et al. |
| 2005/0078745 A1 | 4/2005 | Sinha et al. |
| 2005/0093580 A1 | 5/2005 | Baig et al. |
| 2005/0111589 A1 | 5/2005 | Centurelli et al. |
| 2005/0256989 A1 | 11/2005 | Wolfe et al. |
| 2005/0257030 A1 | 11/2005 | Langhammer |
| 2006/0053244 A1 * | 3/2006 | Fruhauf et al. ............ 710/313 |
| 2006/0067389 A1 | 3/2006 | Tounai et al. |
| 2006/0095605 A1 * | 5/2006 | Lee et al. ............. 710/36 |
| 2006/0095613 A1 * | 5/2006 | Venkata et al. ............. 710/62 |
| 2006/0256909 A1 | 11/2006 | On et al. |
| 2007/0005831 A1 | 1/2007 | Gregorius |
| 2008/0049788 A1 | 2/2008 | McClellan |
| 2008/0080649 A1 | 4/2008 | Gibbons et al. |
| 2008/0225933 A1 | 9/2008 | Chan et al. |
| 2010/0211984 A1 * | 8/2010 | Seo et al. ............. 725/110 |

* cited by examiner

MULTI-PROTOCOL MULTIPLE-DATA-RATE AUTO-SPEED NEGOTIATION ARCHITECTURE FOR A DEVICE

CROSS REFERENCE TO RELATED APPLICATION

This claims the benefit of copending, commonly-assigned U.S. Provisional Patent Application No. 61/305,311, filed Feb. 17, 2010, which is hereby incorporated by reference herein in its entirety.

BACKGROUND OF THE INVENTION

This invention relates to a high-speed serial interface, especially in a programmable integrated circuit device, such as a programmable logic device (PLD), which may operate at different data rates.

It has become common for programmable devices to incorporate high-speed serial interfaces to accommodate high-speed (i.e., greater than 1 Gbps) serial I/O standards.

An early example of such a standard was the XAUI (eXtended Attachment Unit Interface) standard. In accordance with the XAUI standard, for example, a high-speed serial interface includes transceiver groups known as "quads," each of which includes four transceivers and some central logic.

In one implementation, each transceiver is divided into a physical medium attachment (PMA) portion or module which communicates with outside devices, and a physical coding sublayer (PCS) portion or module which performs serial processing of data, for transmission to, or that is received from, those outside devices.

Even when operating under identical standards, a particular serial interface may operate at different speeds, depending, for example, on line conditions. Thus, it is known for the PCS of a serial interface to negotiate with its counterpart for the highest speed that will support reliable transmission and reception at both ends. Originally, in programmable device implementations, such negotiation was carried out in software or in the programmable logic core of the programmable device, outside of the serial interface itself.

Later serial protocols, such as PCI Express Generation 2 ("PCIe2"), 4 Gbps Fibre Channel ("4GFC") and 8 Gbps Fibre Channel ("8GFC"), had shorter speed negotiation windows. Those windows generally were too short for relatively slow software or programmable logic. Accordingly, commonly-assigned U.S. Pat. No. 7,684,477 disclosed a high-speed serial interface of the type described, with a built-in hardware module for automatic speed negotiation to select one of two data rates, that could be incorporated into a programmable device.

Newer serial protocols, such as PCI Express Generation 3 ("PCIe Gen 3") and 40/100 Gigabit Ethernet, may require selection from among three data rates. Moreover, such protocols may require that rate negotiation occur at a fourth, substantially slower, data rate.

SUMMARY OF THE INVENTION

The present invention provides a high-speed serial interface of the type described, in a programmable device, such as a PLD, with a built-in hardware module for automatic speed negotiation. The automatic speed negotiation preferably converges within a limited time interval at the highest possible speed at which a device can establish a valid connection with another device to maximize performance. Preferably, a device can start at either the highest or lowest possible data rate and step either downward or upward, respectively, to converge to the highest speed reliably supported by both devices and their interconnection mechanism.

When the device starts at a high data rate and steps down, the connection is checked at each step. If at a particular step a maximum acceptable bit error rate (e.g., between about $10^{-15}$ and about $10^{-12}$—i.e., between about one error in $10^{15}$ bits and about one error in $10^{12}$ bits) is not exceeded, the data rate remains unchanged. If a maximum acceptable bit error rate is exceeded at a particular step, then the data rate is stepped down again. This continues until a data rate is reached at which a maximum acceptable bit error rate is not exceeded.

When the device starts at a low data rate and steps up, the connection also is checked at each step. However, because each step is being approached from a lower data rate, the fact that a maximum acceptable bit error rate has not been exceeded at a particular step is not conclusive evidence that the maximum possible data rate has been reached. Therefore, as long as a maximum acceptable bit error rate has not been exceeded, the data rate is increased by another step (in accordance with the protocol), until a data rate is reached at which a maximum acceptable bit error rate is exceeded. This is an indication that the data rate has become too high, and so, as above in the case where the device starts high, the data rate is decreased in steps until a data rate is reached at which a maximum acceptable bit error rate is not exceeded. Because the data rate has been increased from lower data rates until a maximum acceptable bit error was exceeded, normally once the decrease of the data rate has begun, the data rate will have to be decreased by only one step unless conditions have changed in the interim.

Depending on the particular implementation, before a rate change is effected, a delimiter pattern may be inserted into the data stream to let the other device know that a rate change is imminent. Other parameters may be exchanged to indicate the direction and magnitude of the rate change.

In a preferred embodiment, once the initial best data rate is established by one of the methods just described, the data rate will decrease if the bit error rate exceeds a maximum acceptable value. Preferably, however, there are also periodic attempts to raise the data rate.

In accordance with the invention, the automatic negotiation process is accelerated by providing hardware, preferably in the PCS portion of the transceiver, to perform at least a part of the negotiation process. In a preferred embodiment, there is one such hardware module per channel—i.e., per PCS transmitter/receiver pair—and another such hardware module for each group of bundled channels (e.g., for one of the "quads" described above, or for a bundle of any number of channels).

On detection of a data rate change requirement, as discussed below, the automatic speed negotiation module changes the channel speed or data rate. This may be accomplished in a number of ways. For example, the width of the data path in the channel could be changed, with a wider data path allowing more data to flow thereby increasing the data rate of the channel, while a narrower data path restricts the amount of data that can flow, decreasing the data rate of the channel. Alternatively, the data rate can be changed by changing or scaling the frequency of operation of the data path. As another alternative, a combination of data path width adjustment and data path frequency scaling may be used to adjust the data rate. As yet another alternative, each channel may include a plurality of PCS modules each of which is appropriate to different protocols and ranges of data rates, and the data rate adjustment may include selecting an appropriate PCS module.

In one embodiment, indication of a data rate change requirement may be provided from outside the PCS. For example, the indication could be initiated completely outside the transceiver by logic elsewhere on the device, such as in the programmable logic portion if the device is a PLD. In another embodiment, the automatic speed negotiation module may include circuitry for determining on its own whether or not a data rate change is required. For example, the module may include a bit-error-rate monitor to monitor the received data (it being apparent that errors in the transmitted data resulting from too high a channel speed will occur only after data leaves the transmitter, so that such errors would not be detectable by the transceiver).

As stated above, when a data rate change is imminent, the protocol in question may require that a delimiter pattern be inserted into the data stream, which must be answered with a similar delimiter pattern before implementation of the data rate change. Therefore, in a preferred embodiment, the automatic speed negotiation module preferably includes a delimiter pattern generator to allow it to insert the delimiter pattern into the transmit path. Preferably, the module also includes delimiter pattern recognition circuitry, which may include a delimiter pattern generator and a comparator that compares data in the receive path to the generated delimiter pattern.

Thus, when a protocol requiring a delimiter pattern for a data rate change is in use, if the automatic speed negotiation module initiates a data rate change, whether because it receives a rate change signal or command from outside the PCS or because its own bit-error-rate monitor indicates the need for a data rate change, it can insert the rate change delimiter pattern in the transmitted data, which will be detected by the remote device so that the remote device can react accordingly (e.g., by changing its own data rate). Similarly, if the automatic speed negotiation module detects the rate change delimiter pattern in the received data, it can react accordingly (e.g., by changing its own data rate).

Under some protocols, the data rate change occurs simultaneously at both ends, after a delimiting pattern has been transmitted and received at each end. This means that if a receiver at one end receives a delimiting pattern after the transmitter at that end has sent a delimiting pattern of its own, then the data rate change process can begin at that end. It will also begin at the other end, which will have both received and sent the delimiting pattern. On the other hand, if the receiver at one end receives a delimiting pattern and the transmitter at that end has not sent a delimiting pattern, then the other end is initiating the request for a data rate change and the transmitter at the one end has to send a delimiting pattern back to the other end before the data rate change begins at that one end (which will now have both received and transmitted the delimiting pattern). Under such protocols, the transmitters at both ends may be tri-stated during the rate-change period for a predetermined duration. A timer preferably is provided in the PCS to time the tristate period.

Certain protocols may include a requirement that the auto-negotiation process itself occur at a much lower data rate than the channel rate itself. For example, under the 40/100 Gigabit Ethernet protocol, the auto-negotiation phase is to be carried out at 156.25 Mbps which is one-eighth of the lowest data rate of 1.25 Gbps under that protocol (as well as one-twentieth of an intermediate rate of 3.125 Gbps and one-sixty-sixth of the highest rate of 10.3125 Gbps). To accommodate this low-frequency signalling requirement, an automatic speed negotiation module in accordance with the present invention may generate an oversampling enable signal. By oversampling each data pulse by a certain factor, one would decrease the effective data rate by that factor. Thus, to achieve, for example, the aforementioned 156.25 Mbps data rate for auto-negotiation under the 40/100 Gigabit Ethernet protocol, the channel could be set to a data rate of 1.25 Gbps and then oversampled by a factor of eight (i.e., eight identical data pulses would be sent for each data pulse, effectively slowing the data rate to one-eighth of its actual value).

Thus, in accordance with the present invention there is provided an interface for use in a local device. The interface includes a transmitter portion programmably configurable to at least three data rates, a receiver portion programmably configurable to those at least three data rates, and an automatic speed negotiation module operatively connected to the transmitter portion and the receiver portion to configure the transmitter portion and the receiver portion for communication with a remote device at a single data rate that is a best available one of those at least three data rates.

A method of negotiating and effecting a data rate change in such a programmable device serial interface is also provided.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION OF THE INVENTION

Commonly-assigned U.S. Pat. No. 7,684,477, which is hereby incorporated by reference herein in its entirety, describes a high-speed serial interface that incorporates a hardware automatic speed negotiation module that allows negotiation among two data rates on a serial interface channel, as well as adjustment of the data rate by adjusting the width of the data path. The present invention, which allows negotiation among multiple (i.e., three or more) data rates, as well as adjustment of the data rate by not only data path width adjustment but also by frequency adjustment or scaling, will now be described with reference to FIGS. 1-4.

Figure 1:
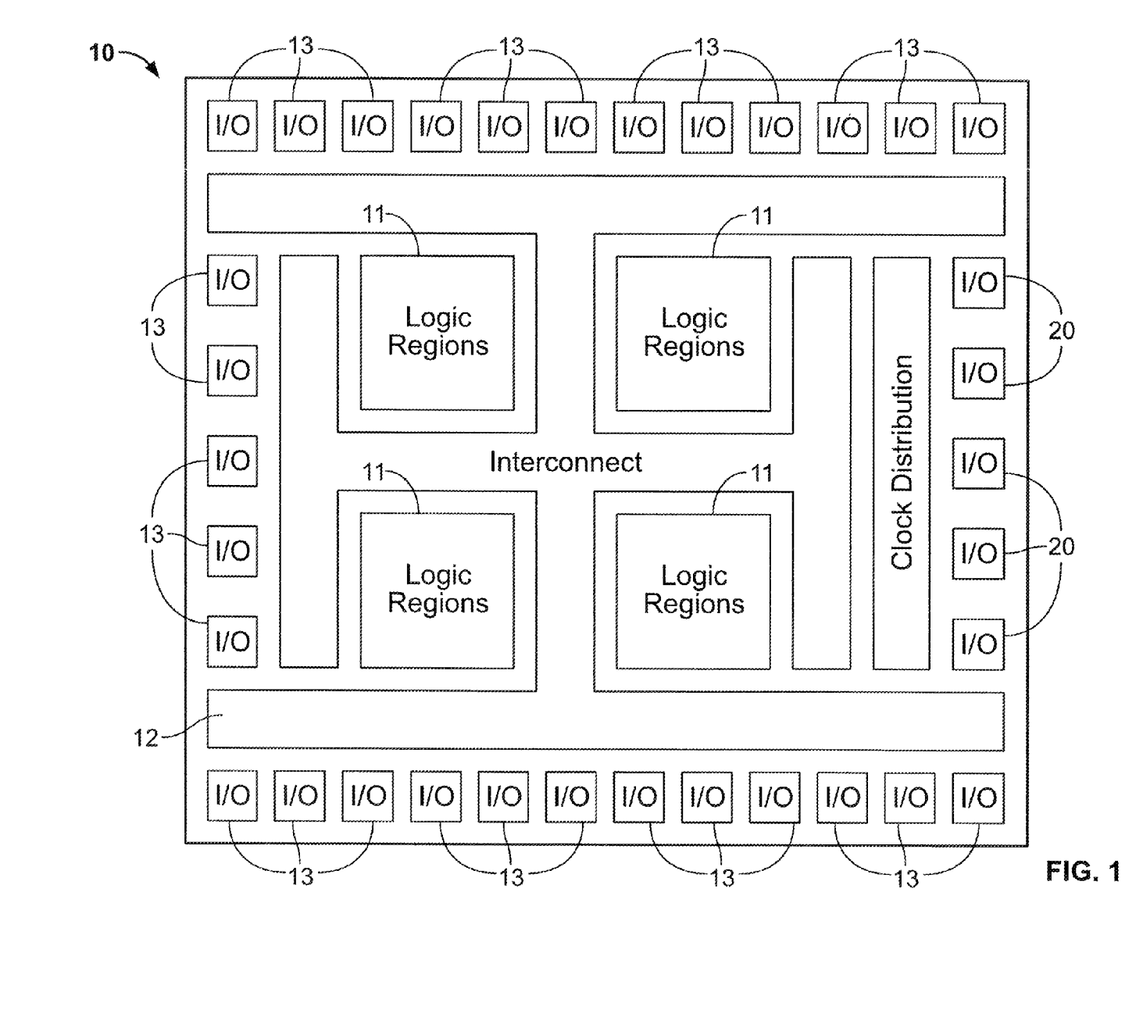
FIG. 1 is a block diagram of a preferred embodiment of a programmable logic device in which the present invention can be used.

PLD 10, shown schematically in FIG. 1, is one example of a programmable device including a serial interface 20 incorporating the invention. PLD 10 has a programmable logic core including programmable logic regions 11 accessible to programmable interconnect structure 12. The layout of regions 11 and interconnect structure 12 as shown in FIG. 1 is intended to be schematic only, as many actual arrangements are known to, or may be created by, those of ordinary skill in the art.

PLD 10 also includes a plurality of other input/output ("I/O") regions 13. I/O regions 13 preferably are programmable, allowing the selection of one of a number of possible I/O signaling schemes, which may include differential and/or non-differential signaling schemes. Alternatively, I/O regions 13 may be fixed, each allowing only a particular signaling scheme. In some embodiments, a number of different types of fixed I/O regions 13 may be provided, so that while an individual region 13 does not allow a selection of signaling schemes, nevertheless PLD 10 as a whole does allow such a selection.

Figure 2:
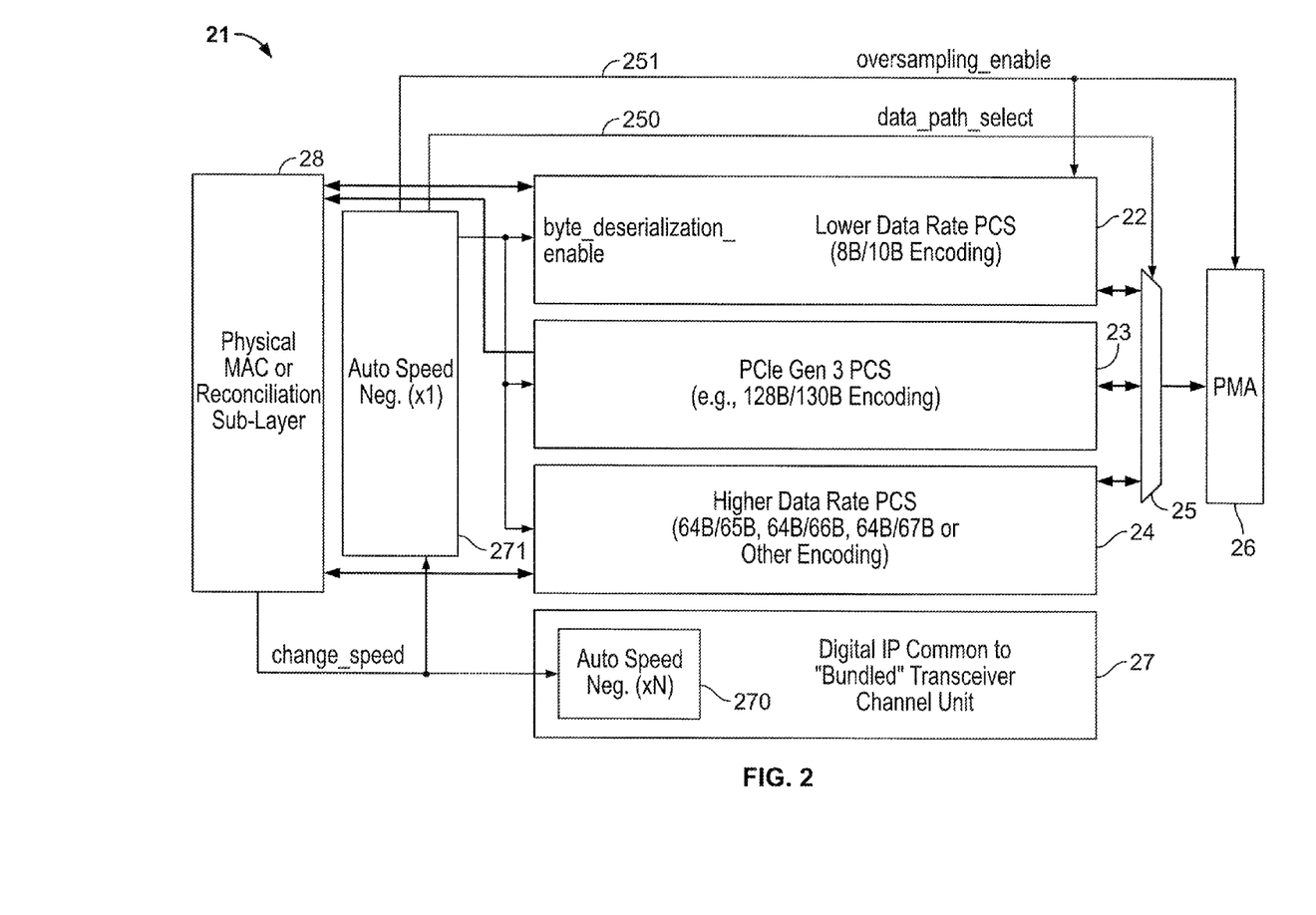
FIG. 2 is a schematic diagram of a serial interface in which the present invention may be incorporated.

For example, as shown in FIG. 2, each I/O region 20 preferably is a high-speed serial interface as described above, preferably including a plurality (e.g., four) of channels 21, although only one channel 21 is shown. Each channel 21 includes its own PMA module 26, and may include a plurality of different PCS modules to support a plurality of different protocols. In the example shown, channel 21 includes three different PCS modules 22, 23, 24, one of which is connected to PMA module 26 by multiplexer 25 under the control of data_path_select signal 250. In this example, PCS module 22 is a lower-data-rate PCS for supporting slower protocols, such as those using 8B/10B encoding. PCS module 23 may be a PCIe Gen 3 PCS, capable of supporting the PCIe Gen 3 protocol using 128B/130B encoding, and preferably backward-compatible with earlier generations of the PCI Express protocol. PCS module 24 may be a higher-date-rate PCS capable of supporting other protocols, such as those using 64B/65B encoding, 64B/66B encoding, 64B/67B encoding, or other encoding schemes.

Central logic 27 may be shared by a plurality (N) of channels 21 and may include an automatic speed negotiation module 270 for use in situations where all of channels 21 are used with the same protocol. Each channel 21 preferably also has its own automatic speed negotiation module 271, for use in situations where channels 21 are used with different protocols. Preferably, automatic speed negotiation modules 271 are identical to automatic speed negotiation module 270, although that is not necessary.

At the ends of PCS modules 22, 23, 24 opposite from PMA module 26, each of the PCS modules 22, 23, 24 may be connected to a Physical MAC Reconciliation Sublayer (PHY/MAC) 28 or other connection to a remote communication fabric.

Figure 3:
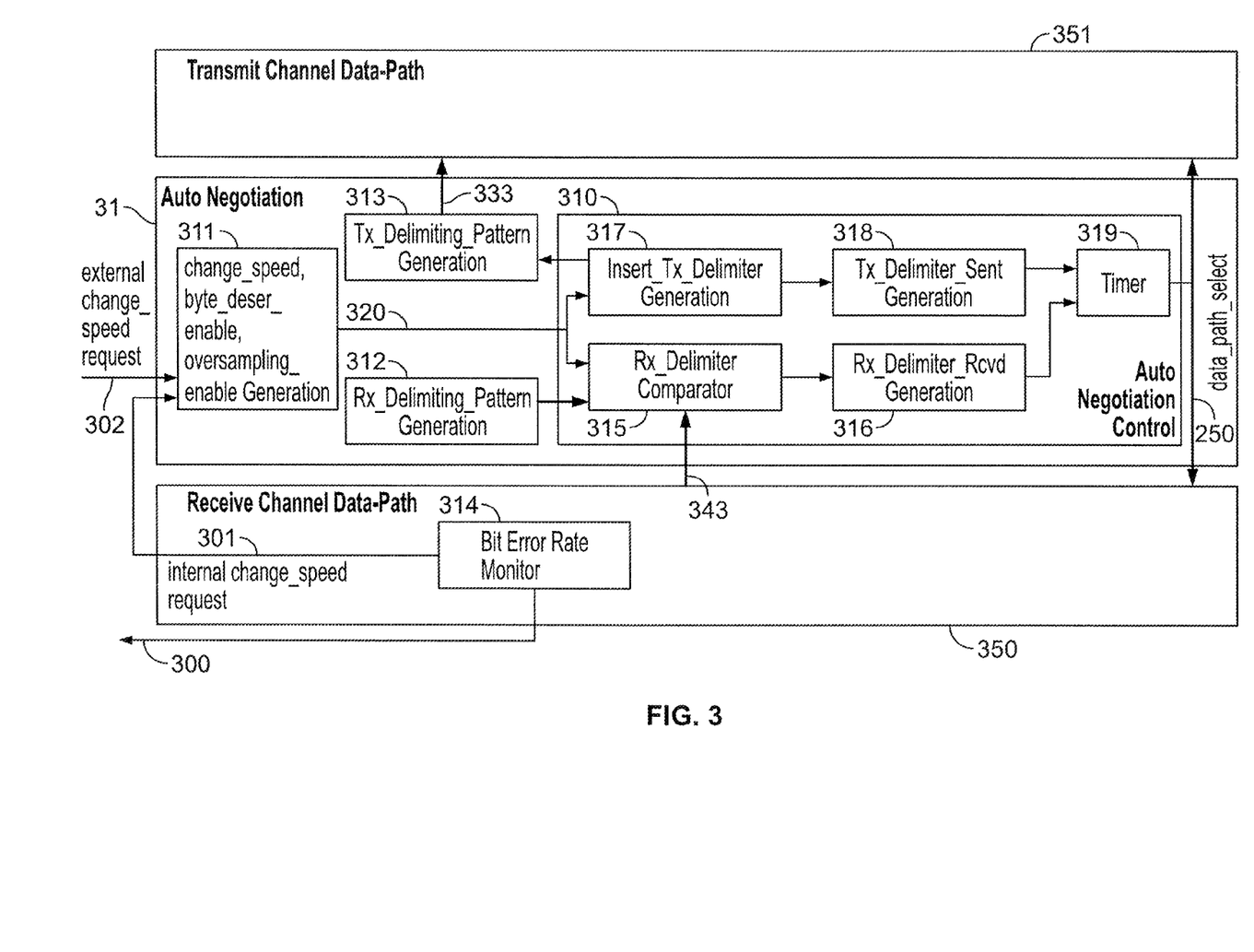
FIG. 3 is a schematic diagram of a preferred embodiment of an exemplary automatic speed negotiation module in accordance with the present invention.

FIG. 3 shows one embodiment 31 of an automatic speed negotiation module 31 in accordance with the invention, which may serve as one or both of automatic speed negotiation module 270, 271. Automatic speed negotiation module 31 is shown relative to PCS receiver portion 350 and PCS transmitter portion 351, but the actual physical arrangement of automatic speed negotiation module 31 relative to any PCS or portions thereof may be different.

Automatic speed negotiation module 31 preferably includes rate-change signal generator 311, receive-rate delimiter generator 312, transmit-rate delimiter generator 313, bit-error-rate monitor 314 (shown outside module 31 but considered a component thereof), and automatic speed negotiation controller 310. Automatic speed negotiation controller 310 preferably includes receive-rate delimiter comparator 315, receive-rate delimiter reception signal generator 316, transmit-rate delimiter insertion unit 317, transmit-rate delimiter transmission signal generator 318, and timer 319.

Automatic speed negotiation module 31 may need to change the data rate because an excessive bit error rate is detected in received data, or because some portion of the device external to the transceiver, operating in accordance with the relevant protocol, issues a rate-change signal (up or down), or because a remote device has changed its data rate (whether because the remote device detected an excessive bit error rate or for another reason) and included a rate-change delimiter pattern in data received by PCS receiver portion 350. If the excessive bit error rate is detected in the received data, it may be detected by bit-error-rate monitor 314, which sends an indication via line 300 to the device logic, or via line 301 directly to rate-change signal generator 311. If the indication is sent to the device logic, the device logic will process the indication and send a signal via line 302 to rate-change signal generator 311. Either way, rate-change signal generator 311 will generate a rate-change signal 320—which may be a change-speed signal, or an oversample-generation signal—and send that signal to automatic speed negotiation controller 310.

Automatic speed negotiation controller 310 would then change the data rate in accordance with the rate change signal. Depending on the nature of the rate-change signal, the method of changing the data rate may be to (a) generate and issue a signal causing various multiplexers to select a narrower or wider data path, which has the effect, respectively, of reducing or increasing the serial data rate, (b) instruct a PLL on the device to change its data rate (or select a PLL having a different data rate), or (c) enable oversampling by a certain factor to slow down the data rate by that factor. In addition, automatic speed negotiation controller 310 may generate data_path_select signal 250 to select one of PCS modules 22, 23, 24 appropriate to the new data rate. Also, byte serialization or deserialization may be enabled or disabled to alter the width of the data, depending on the new data rate, for transfer to/from the remainder of the programmable device.

As discussed above, the protocols involved may expect or at least allow the insertion of a rate-change delimiter pattern in the data when a data rate change is imminent, so that the remote device can prepare for the data rate change. Thus, in the embodiment of FIG. 3, receive-rate delimiter generator 312 and transmit-rate delimiter generator 313 generate those delimiter signals. Because each transceiver would be expected to be able to communicate with each other transceiver, normally one would expect the receive-rate delimiter pattern and the transmit-rate delimiter pattern to be the same, so that one delimiter generator should be sufficient. However, there may be cases where the receive-rate delimiter pattern and transmit-rate delimiter pattern are different, so preferably, for maximum flexibility both receive-rate delimiter generator 312 and transmit-rate delimiter generator 313 are provided.

Thus, if an error signal is generated by bit-error-rate monitor 314 or a rate-change signal is generated by the device logic, resulting in a data rate change, then preferably when rate-change signal generator 311 sends the resulting rate-change command to automatic speed negotiation controller 310, it causes transmit-rate delimiter insertion unit 317 to instruct transmit-rate delimiter generator 313 to insert the transmit-rate delimiter pattern into the transmitted data stream via line 333.

In addition, transmit-rate delimiter insertion unit 317 preferably causes transmit-rate delimiter transmission signal generator 318 to send a signal to timer 19 indicating that the transmit-rate delimiter pattern has been transmitted, so that timer 19 begins counting down the delay period, discussed above, during which transmission of data is inhibited (preferably by tristating the transmitter), while the appropriate control signals are sent to change the rate.

Similarly, if a delimiter signal is received, it can be detected at 343 by receive-rate delimiter comparator 315, which preferably continually compares the received data at 343 to the delimiter pattern generated by receive-rate delimiter generator 312. Receive-rate delimiter comparator 315 preferably causes receive-rate delimiter reception signal generator 316 to send a signal to timer 19 indicating that the receive-rate delimiter pattern has been received, so that timer 19 begins counting down the delay period, discussed above, during which transmission of data is inhibited (preferably by tristating the transmitter), while the appropriate control signals are sent to change the rate.

Under some protocols, it may be contemplated that before the rate on a channel can change, preferably both the transceiver at the end instigating the change and the transceiver at the other end must send and receive a delimiting pattern, and then preferably waits for the delay period timed by timer 19 to elapse. Thus, the instigating end preferably sends a delimiter pattern and receives a delimiter pattern and then preferably waits for the delay period to elapse. Similarly, the non-instigating end preferably receives a delimiter pattern and sends a delimiter pattern and then preferably waits for the delay period timed by timer 19 to elapse.

However, there may be other protocols or modes of operation under which, during operations within the present invention, timer 19 is optional. In such embodiments, the rate may change as soon as both ends have both sent and received a delimiter pattern. Similarly, there may be other protocols or modes of operation under which the use of a pair of delimiter signals may be optional, and the rate change could be initiated following transmission of a delimiter pattern by the instigating end followed by the elapse of the delay period (the instigating end would begin timing the delay on transmission of the delimiter pattern, while the non-instigating end would begin timing the delay on receipt of the delimiter pattern). It is even conceivable that in some embodiments, the instigating end would change its rate immediately after transmitting the delimiter pattern, and the non-instigating end would change its rate immediately upon receipt of the delimiter pattern.

Figure 4A:
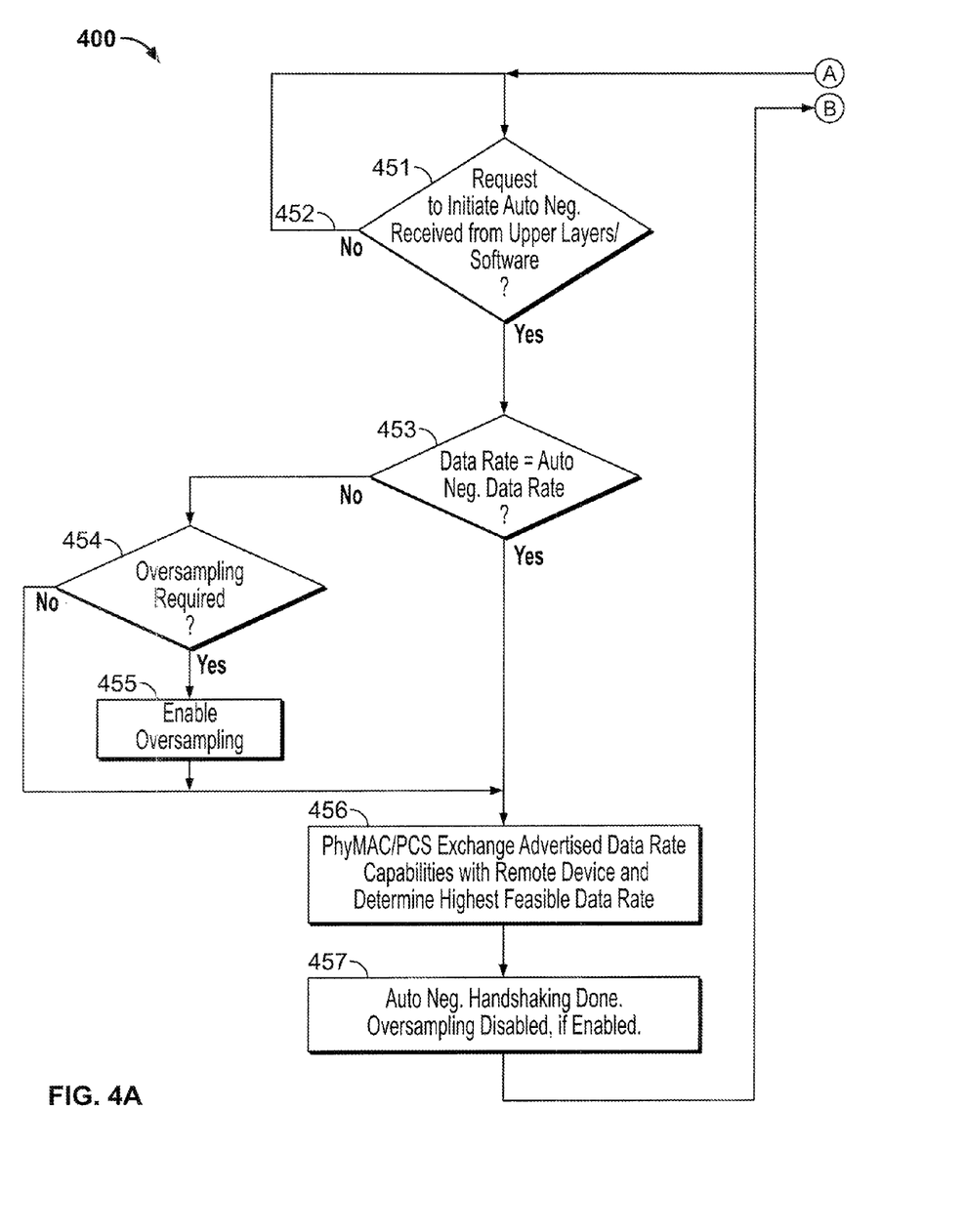
FIGS. 4A and 4B (hereinafter collectively referred to as FIG. 4) are a flow diagram of the operation of an automatic speed negotiation module of the embodiment of FIG. 3.
Figure 4B:
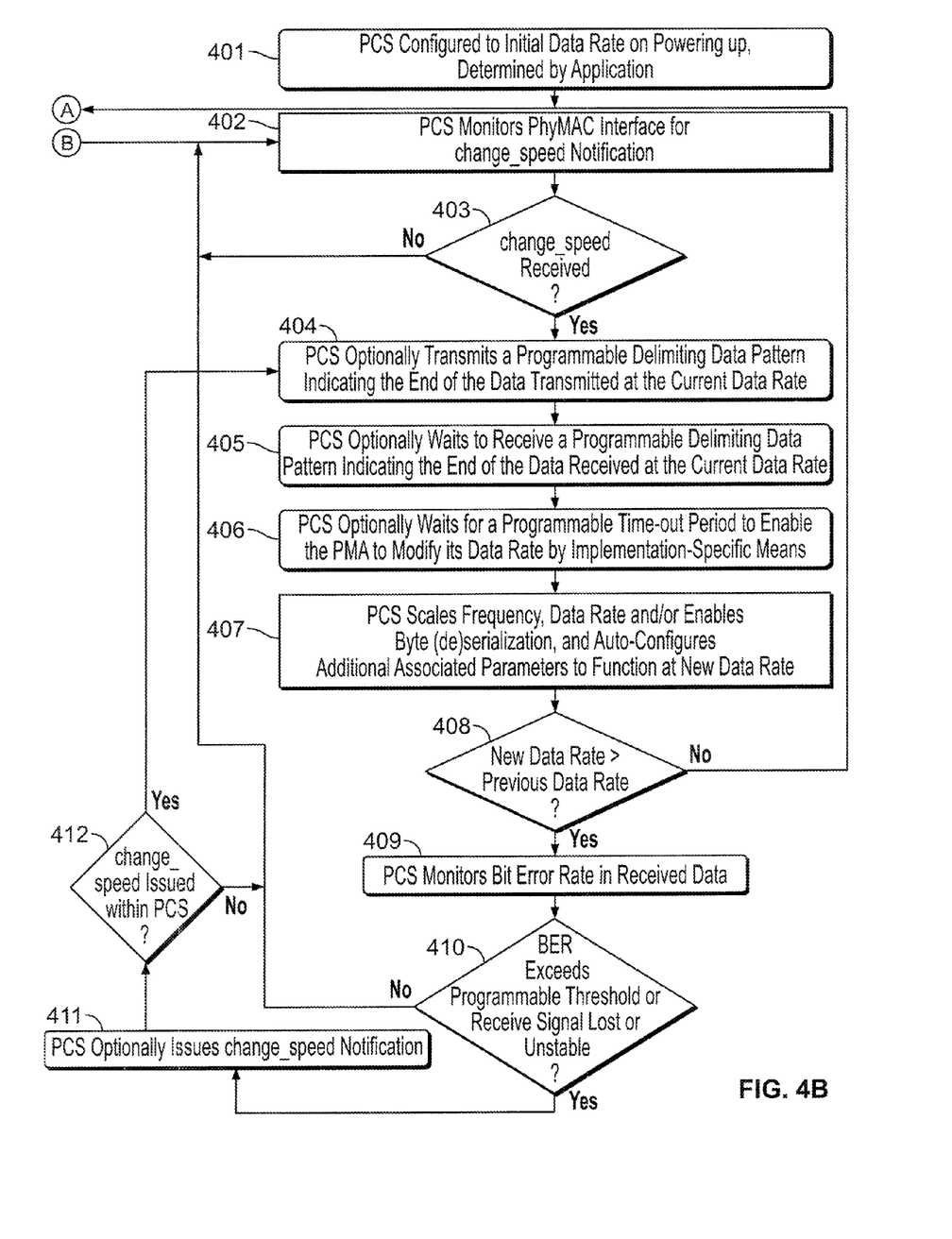

FIG. 4 shows the preferred mode of operation 400 of automatic speed negotiation module 31 in an embodiment where the data rate may be increased as well as decreased, and where use of a delimiter pattern is optional. The process starts at step 401 where the PCS is powered up and configured to an initial data rate determined by the application for which it is being used.

Next, at test 451, the PCS (i.e., automatic speed negotiation module 31 of the PCS) determines whether or not a request to begin auto-negotiation has been received (e.g., from software or from other protocol layers). If no request has been received, then at 452, monitoring continues until a request to begin auto-negotiation has been received. Any request to begin auto-negotiation may specify a data rate at which auto-negotiation is to occur, and once an auto-negotiation request has been received, at test 453 it is determined whether the current data rate matches any specified data rate at which auto-negotiation is to occur.

If the current data rate does not match the specified data rate at which auto-negotiation is to occur, then at test 454 it is determined whether the specified data rate at which auto-negotiation is to occur is so low as to require oversampling. If the specified data rate at which auto-negotiation is to occur is so low as to require oversampling, then at step 455 oversampling is enabled (e.g., by asserting oversampling_enable signal 251) and automatic speed negotiation module 31 continues to step 456. If at test 454 it is determined that the specified data rate at which auto-negotiation is to occur is not so low as to require oversampling, then step 455 is skipped and the automatic speed negotiation method continues to step 456.

If at test 453 it was determined that the current data rate matches any specified data rate at which auto-negotiation is to occur, then the automatic speed negotiation method continues to step 456.

At step 456, PHY/MAC 28 and PCS 22/23/24 exchange data rate capabilities with the remote device and determine the highest feasible data rate. At that point, at step 457, auto-negotiation handshaking is completed. If oversampling had been enabled at step 455, oversampling is disabled (e.g., by de-asserting oversampling_enable signal 351). Either way, the automatic speed negotiation method continues to step 402, and monitors the PHY/MAC interface 28 for a rate-change signal. At test 403, if there is no rate-change signal, the method loops back to step 402 until at step 403 there is a rate-change signal.

Once there is a rate-change signal at test 403, then at step 404, the delimiter pattern optionally is transmitted, at step 405 receipt of a delimiter pattern optionally is awaited, and then at step 406 passage of the delay period (timer 319) optionally is awaited to allow the PMA or other remote device to modify its own data rate, after which, at step 407 the PCS data rate is adjusted by scaling the data width, or by scaling the frequency or clock (e.g., by adjusting a PLL or selecting a different PLL). Other related parameters may also be adjusted, such as clock multiplexer control inputs, and the bypassing/enabling of blocks within the selected PCS module 22/23/24 (as described, e.g., in above-incorporated U.S. Pat. No. 7,684,477). In addition, byte serialization or deserialization may be enabled or disabled to alter the width of the data, depending on the new data rate, for transfer to/from the remainder of the programmable device.

Next, at test 408, the method tests to see if the new data rate is higher than the previous data rate—i.e., to see if the data rate has been increased. If not, the method returns to step 451 and waits for an auto-negotiation initiation request. If at test 408 the data rate has been increased, then at step 409 and test 410, bit-error-rate monitor 314 is monitored for an increase in the error rate to unacceptable levels (this is not normally a concern when the data rate has been decreased), and if there is no increase after a predetermined interval (which may vary by implementation), the method returns to step 402 and waits for a rate-change signal. If there is a bit-error-rate increase to unacceptable levels within that interval, then at step 411 bit-error-rate monitor 314 itself may cause generation of a rate-change signal. If test 412 determines that at step 411 no rate-change signal has been generated, then the method returns to step 402 and waits for a rate-change signal. If test 412 determines that at step 411 a rate-change signal has been generated, then the method returns to step 404 to process the rate change.

Thus it is seen that a serial interface with a hardware speed negotiation module, which allows faster processing of data rate changes in response to error signals, has been provided. Implementing this feature on a per-channel basis optimizes system performance, enabling each individual channel to function at its own highest reliable data rate. Alternatively, in the case of bundled channels, the auto-negotiation module may be shared.

As an example of combinations of data path and frequency scaling according to embodiments of the invention, 16×8 bits could be transmitted at 125 MHz (PCIe Gen 1), or at 250 MHz (PCIE Gen 2), or at 500 MHz (PCIe Gen 3). As another example, 8×8 bits transmitted at 250 MHz under PCIe Gen 1 could be scaled to 8×8 bits at 500 MHz under PCIe Gen 2, and to 16×8 bits at 500 MHz under PCIe Gen 3.

As an example of the use of byte deserialization in embodiments of the invention, 32×8 bits transmitted at 250 MHz under PCIe Gen 3 could become 16×8 bits at 250 MHz under PCIe Gen 2 using byte deserialization at the PCS interface, or 16×8 bits at 125 MHz under PCIe Gen 2 using byte deserialization at the PCS interface. In a programmable device, this allows the reuse of programming developed for earlier generations.

A PLD 10 incorporating interfaces 20 according to the present invention may be used in many kinds of electronic devices. One possible use is in a data processing system 900 shown in FIG. 5. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

Figure 5:
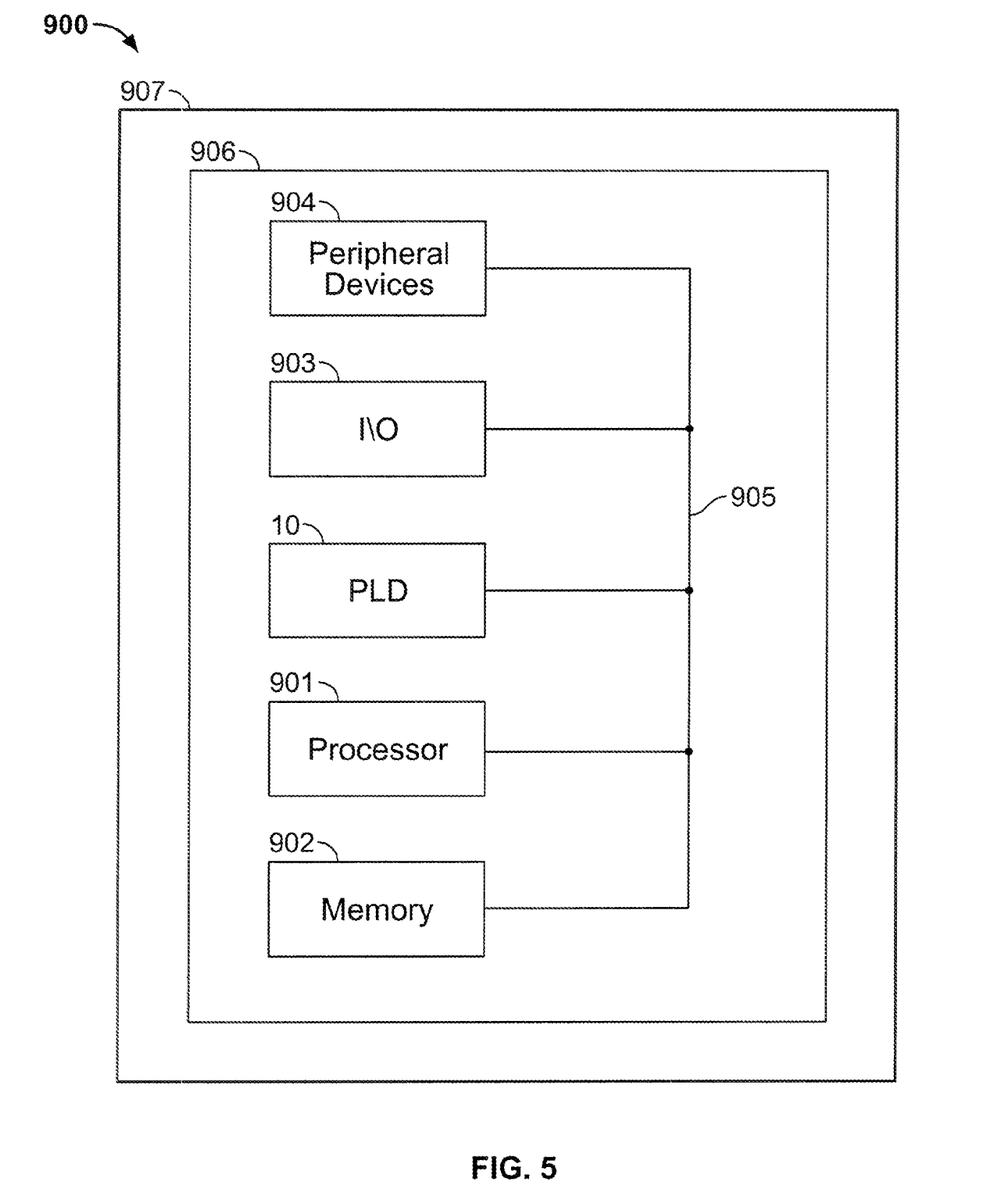
FIG. 5 is a simplified block diagram of an illustrative system employing a programmable logic device incorporating a serial interface in accordance with the present invention.

System 900 can be used in a wide variety of applications, such as computer networking, data networking, instrumentation, video processing, digital signal processing, or any other application where the advantage of using programmable or reprogrammable logic is desirable. PLD 10 can be used to perform a variety of different logic functions. For example, PLD 10 can be configured as a processor or controller that works in cooperation with processor 901. PLD 10 may also be used as an arbiter for arbitrating access to shared resources in system 900. In yet another example, PLD 10 can be configured as an interface between processor 901 and one of the other components in system 900. It should be noted that system 900 is only exemplary, and that the true scope and spirit of the invention should be indicated by the following claims.

Various technologies can be used to implement PLDs 10 as described above and incorporating this invention.

It will be understood that the foregoing is only illustrative of the principles of the invention, and that various modifications can be made by those skilled in the art without departing from the scope and spirit of the invention, and the present invention is limited only by the claims that follow.

What is claimed is:

1. An interface for use in a local device, said interface comprising:
   a transmitter portion programmably configurable to at least three data rates;
   a receiver portion programmably configurable to said at least three data rates; and
   an automatic speed negotiation module operatively connected to said transmitter portion and said receiver portion to configure said transmitter portion and said receiver portion for communication with a remote device at a single data rate that is a best available one of said at least three data rates, said automatic speed negotiation module being operatively connected to said transmitter portion and said receiver portion so as to be able to perform all of:
   adjusting transmitter data path width and receiver data path width,
   adjusting a frequency of said transmitter data path and said receiver data path, and
   oversampling; wherein:
   said automatic speed negotiation module configures said transmitter portion and said receiver portion to said best available one of said at least three data rates by selectively performing at least one of said adjusting transmitter data path width and receiver data path width, said adjusting a frequency of said transmitter data path and said receiver data path, or said oversampling.

2. The interface of claim 1 wherein said automatic speed negotiation module configures said transmitter portion and said receiver portion by enabling/disabling byte serialization/deserialization to alter data width for transfer to/from a portion of said local device other than said interface.

3. The interface of claim 1 further comprising respective PCS modules for respective data rate ranges, wherein:
   said automatic speed negotiation module configures said transmitter portion and said receiver portion to said best available one of said at least three data rates by selecting one of said respective PCS modules.

4. The interface of claim 1 wherein said automatic speed negotiation module configures said transmitter portion and said receiver portion in response to a signal from another portion of said local device.

5. The interface of claim 4 wherein said signal is an error signal indicating a data error in at least one of said transmitter portion and said receiver portion.

6. The interface of claim 4 wherein:
   said automatic speed negotiation module comprises a bit-error-rate monitor to monitor data in said receiver portion; and
   said other portion of said local device receives output from said bit-error-rate monitor and generates said signal based on said output.

7. The interface of claim 4 wherein:
   said transmitter portion is tri-stated for a predetermined duration during configuring of said transmitter portion and said receiver portion; and
   said automatic speed negotiation module comprises a timer to time said predetermined duration.

8. The interface of claim 1 wherein said automatic speed negotiation module monitors said receiver portion and configures said transmitter portion and said receiver portion in response to results of said monitoring.

9. The interface of claim 8 wherein:
   said automatic speed negotiation module comprises a bit-error-rate monitor to monitor data in said receiver portion; and
   said automatic speed negotiation module configures said transmitter portion and said receiver portion in response to a signal from said bit-error-rate monitor.

10. The interface of claim 8 wherein:
    said automatic speed negotiation module monitors said data in said receiver portion for occurrence of a delimiter pattern; and
    said automatic speed negotiation module configures said transmitter portion and said receiver portion in response to said occurrence of said delimiter pattern.

11. The interface of claim 10 wherein said automatic speed negotiation module comprises:
    a pattern generator to generate said delimiter pattern; and
    a comparator to compare data in said receiver portion to said delimiter pattern.

12. The interface of claim 8 wherein said automatic speed negotiation module comprises a timer to delay configuring of said transmitter portion and receiver portion after receipt of said signal.

13. The interface of claim 1 wherein:
    said automatic speed negotiation module comprises a pattern generator to generate a delimiter pattern; and
    said automatic speed negotiation module inserts said delimiter pattern into data in said transmitter portion prior to configuring said transmitter portion and said receiver portion.

14. A method for negotiating a data rate in an integrated circuit device interface, said method comprising:
    providing, in said interface, ability to perform both:
    adjusting transmitter data path frequency and receiver data path frequency, and
    oversampling;

monitoring said interface for occurrence of one of (a) a rate change signal, and (b) a rate change instigation delimiter pattern;

on detection of said rate change signal, transmitting said rate change instigation delimiter pattern, and awaiting receipt of a rate change acknowledgment delimiter pattern;

on detection of said rate change instigation delimiter pattern, transmitting said rate change acknowledgment delimiter pattern; and on occurrence of one of (a) receipt, and (b) transmission, of said rate change acknowledgment delimiter pattern, changing said data rate by selectively performing at least one of said adjusting transmitter data path frequency and receiver data path frequency, or said oversampling.

15. The method of claim 14 further comprising enabling/disabling byte serialization/deserialization to alter data width for transfer to/from an integrated circuit portion other than said interface.

16. The method of claim 14 wherein said changing said data rate further comprises adjusting transmitter data path width and receiver data path width.

17. The method of claim 14 wherein said changing said data rate further comprises selecting one of a plurality of respective PCS modules.

18. The method of claim 14 further comprising, after said occurrence of one of (a) receipt, and (b) transmission, of said rate change acknowledgment delimiter pattern, and before said changing said data rate, waiting for a predetermined time interval to elapse.

19. The method of claim 14 wherein said monitoring for occurrence of a rate change signal comprises monitoring for a rate change signal from a portion of said integrated circuit device outside said interface.

20. The method of claim 14 wherein said monitoring for occurrence of a rate change signal comprises monitoring for a rate change signal from a component of said interface.

21. The method of claim 20 wherein said monitoring for occurrence of a rate change signal comprises monitoring for a rate change signal from a bit error rate monitor in said interface.

* * * * *